Aug. 15, 1967     D. LEIBL     3,336,474
SPHERICAL LIGHTING FIXTURE
Filed Sept. 9, 1965
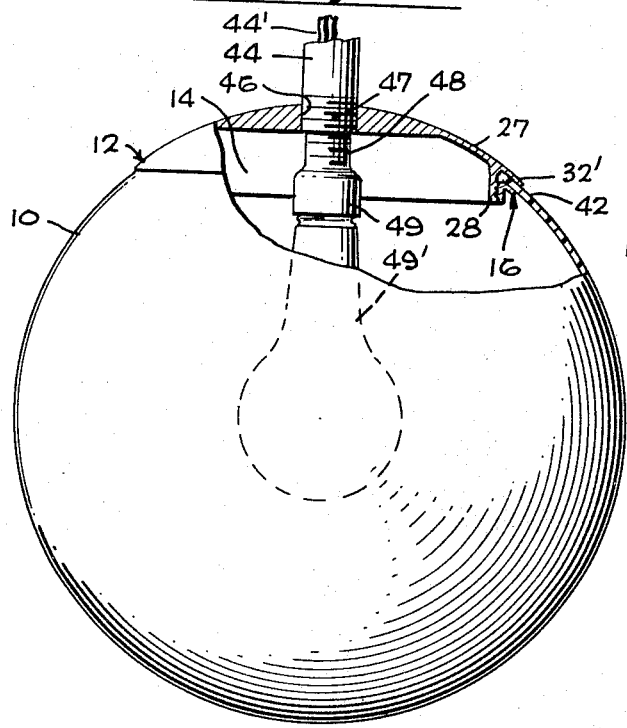
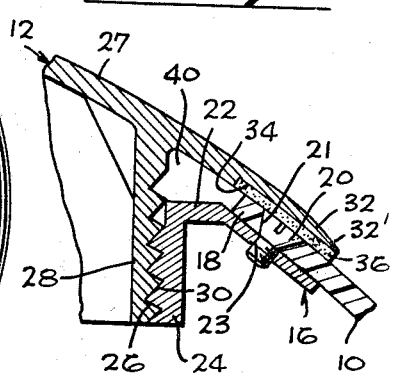
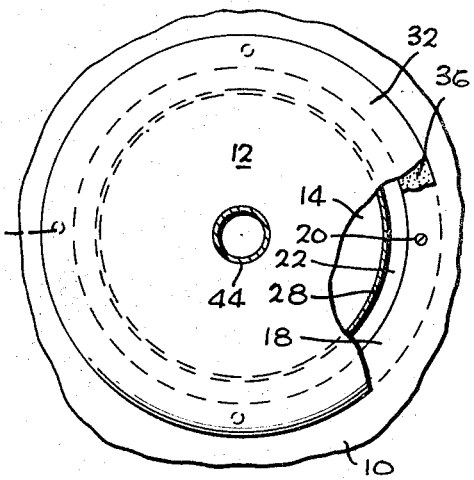
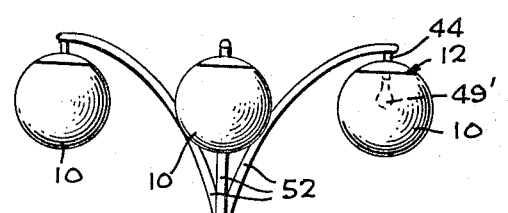
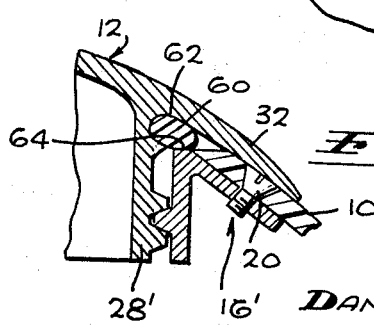
INVENTOR.
DANIEL LEIBL
BY Max Golden
ATTORNEY

United States Patent Office 3,336,474
Patented Aug. 15, 1967

3,336,474
SPHERICAL LIGHTING FIXTURE
Daniel Leibl, Long Beach, Calif., assignor to Commercial Reflector & Manufacturing Company, Inc., Los Angeles, Calif., a corporation of California
Filed Sept. 9, 1965, Ser. No. 486,175
4 Claims. (Cl. 240—100)

This invention relates to a lighting fixture or element comprising a translucent plastic ball, and is particularly concerned with the provision of a lighting fixture assembly comprising a relatively large translucent plastic ball securely positioned on a mounting, the mounting for the ball being of simple rugged construction preventing disengagement of the ball by high winds or vibration.

Relatively wide usage is now being made of translucent or transparent glass and plastic balls for covering and protecting electric lights and lamps particularly employed for area lighting, such as the lighting of streets, parking areas, malls, and other large open areas. Such balls are also employed for decorative purposes, and particularly in the case of large area lighting such balls are of relatively large size, for example, 12 to 24 inches or more in diameter.

Heretofore, it has been the practice to mount such balls on suitable standards, bases and the like, by means of a relatively large number of fastening components and often usually by means of specially designed fasteners and mountings of relatively complex structure and high cost. However, these mounting structures in most instances have not proved satisfactory in that the protective balls are subject to breaking loose from the attached mountings when the fixtures are subjected to high winds and substantial vibrations. Also, in the case of plastic balls which have become quite popular for this purpose, the plastic is prone to cracking under such rigorous climatic conditions and high vibration. Also, with the mounting structures heretofore employed, rain water frequently undesirably enters into the interior of the ball through openings in the mountings and fasteners.

It is accordingly an object of the invention to provide a simple mounting for translucent balls, particularly large plastic balls, employed for area lighting, composed of a minimum of parts, which permits easy and quick assembly of the ball on the mounting, which is composed of a minimum of structural elements, which fastens the ball securely to the mounting without danger of disengagement therefrom or the breaking or cracking of the ball, under rigorous wind and vibration conditions, and which completely encloses the ball, the mounting being rugged and reliable in use yet relatively inexpensive. Another object is the provision of an improved plastic ball and mounting assembly having the foregoing characteristics and advantages.

According to the invention, a novel rigid mounting is provided particularly for a large plastic ball or globe designed especially for use for area lighting, so that the entire assembly of ball and mounting is in effect composed of only two parts, the ball having a suitable fastener connected thereto and the mounting having a mating fastener which cooperates with the fastener on the ball. The ball or globe when mounted by means of the invention structure is securely held against any loosening or breakage by wind, vibrations and the like, and as a result of such secure and rigid fastening, the danger of the cracking or breaking of the ball is greatly minimized or avoided.

Briefly, the lighting fixture of the invention comprises a translucent plastic ball having an opening on one side thereof and a ring positioned on the ball around the inner periphery of the ball opening, means being provided to securely connect the ring to the ball around such opening. The ring has attached thereto a screw connector. The mounting for the ball includes a hood which when assembled on the ball is positioned over the ball opening, the hood having attached thereto a screw connector. The hood has a peripheral edge which carries on its inside surface a resilient backing element, preferably in the form of a rubber ring.

The ball is assembled on the hood by threadably engaging the screw connector on the ring attached to the ball around its opening, with the screw connector of the hood or mounting element so that when the ball is turned down tightly against the hood, the outer peripheral surface of the ball adjacent its opening is in secure engagement with the backing element, thus sealing the space between the overlapping peripheral edges of the ball opening and the hood.

In this manner, when the ball is securely engaged with the hood or mounting, the opening in the ball is completely closed and the threaded connectors on the ball and the hood are entirely enclosed within the assembly, preventing introduction of rain or snow into the interior of the ball or into contact with the connecting elements therein. The hood has a rounded periphery and forms a segment of a sphere which fits over the ball opening so that the ball and hood assembly presents in effect a unitary sphere and the overlapping edge of the hood in engagement with the adjacent peripheral edge of the ball around the opening is designed so that there is in effect substantially a continuation of the sphere of the ball presented by such overlapping edges. Since the ball and hood together form substantially a unitary sphere and the connecting elements between the mounting or hood, and the ball are within the assembly, high winds cannot loosen the connection, and since the overlapping edges of the hood and the ball around its opening are in tight engagement, this adds a further safety factor against loosening of the ball from engagement with the hood or mounting by high winds or vibrations.

The hood carries a hollow hub or tube which can be suitably connected to a support for the globe and mounting assembly, such as a standard, base, or mounting stem. An electric light or bulb is suitably mounted within the hood, and the hollow hub or the tube provides for the passage of electrical wires from the bulb or bulbs to the exterior.

The invention will be more clearly understood from the description below of a preferred embodiment taken in connection with the accompanying drawing wherein:

FIG. 1 is a view in elevation of the translucent ball or globe mounted by means of the invention structure;

FIG. 2 is a plan view of the assembly of FIG. 1, shown partly broken away for clarity;

FIG. 3 shows a detail of the assembly of FIG. 1, particularly showing the means for securely connecting and mounting the ball on the hood;

FIG. 4 illustrates the application of the lighting fixture of the invention mounted on a suitable standard for area lighting;

FIG. 5 illustrates the lighting fixture of the invention as a pendant mounted fixture; and FIG. 6 shows a modification of a structural detail of the invention device.

In FIG. 1 there is shown a plastic ball or globe 10, usually preferably of a relatively large diameter, securely mounted according to the invention on a mounting or hood indicated at 12. The ball or globe 10 can be formed of any suitable plastic material, such as acrylics, cellulous acetate-butyrate, polystyrene, and the like. The hood 12 is preferably formed of a suitable metal such as cast aluminum.

The plastic ball has a circular opening 14 therein having a diameter which is less than, and usually substantially less than, the diameter of the ball. A mounting ring indicated generally at 16, and formed of a metal such as cast aluminum, is connected to the inside surface of the ball at its peripheral edge 18 around the opening 14 in the ball. The ring 16 is securely attached to the peripheral edge 18 of the ball by means of a plurality, shown as four in FIG. 2, of screws 20, spaced substantially equally about the peripheral edge 18 of the ball. It has been found most convenient and for obtaining a tight connection of ring 16 to the ball, to employ countersunk screws 20 for this purpose, with cooperating countersunk holes 21 formed in the plastic ball and holes 23 tapped into the ring for threaded engagement of the screws with the ring. Screw fasteners of this type are particularly preferred for balls formed of plastic, since it is difficult to employ such fasteners on glass balls. The ring 16 has an inwardly bent portion 22 which carries an integral flange 24 which extends inwardly into and toward the center of the ball. The flange 24 is internally threaded as indicated at 26.

The hood 12 is formed of a spherical segment 27 having a radius substantially the same as the radius of curvature of the ball so that when assembled on the ball 10, it provides a cover over the ball, and the ball and hood assembly form in effect a unitary sphere. The hood 12 carries a flange 28 which is externally threaded at 30 to mate with the internally threaded flange 24 on the ring 16 carried by the ball. The hood or mounting 12 has an outer peripheral edge 32 which overlaps the outer surface of the peripheral edge 18 of the ball around its opening 14. On the inside surface of the peripheral edge 32 of the hood 12 there is preferably provided a groove 34 which is designed to receive a resilient backing element or ring 36. Such backing element can be formed of any suitable resilient material, such as rubber, for example, a silicone or neoprene rubber being preferred. The backing ring 36 can be attached to the surface of the groove 34 by any suitable means such as by a suitable glue or adhesive. If desired, the groove 34 can be omitted, and the backing element 36 secured to the inside surface of the peripheral edge 32 of the hood.

When the ball 10 and its attached ring 16 and screw connecting flange 24, is threadably engaged with the screw connecting flange 28 of the hood 12, and elements 24 and 28 are turned down sufficiently, the peripheral edge 18 of the ball around the opening 14 therein, engages the resilient or rubber backing ring 36 on the inside surface of the peripheral edge 32 of the hood, and securely mounting the ball 10 and its ring 16 on the hood 12. When engaged, it will be seen that the backing element 36 overlays the screws 20 for connecting the ring 16 to the ball, resulting in a tight secure engagement of the ball 10 on the ring 12 and forming in effect a unitary sphere as noted above. The external surface of the peripheral edge 32 of the hood is preferably tapered as indicated at 32', to provide, as much as possible, an effective continuation of the spherical surface of the ball at such overlapped edge 32. Also, it is noted that the connecting elements 16, 24 and 28 for connecting the ball to the hood are entirely enclosed within the spherical assembly as a result of the sealing of the overlapping peripheral edges 32 of the hood and 18 of the ball.

Thus, by means of the mounting structure of the invention, there is provided a tight secure engagement of the ball on the hood by means not only of the threaded connecting elements 24 and 28 but also by means of the frictional engagement of the overlapping peripheral edges 18 and 32 of the ball and hood, with the backing element 36 forming a tight seal therebetween. These structural features not only prevent loosening of the connections 24 and 26 between the ball mounting 16 and the hood 12, as by high winds or vibrations, but also this structure prevents winds, rain and atmospheric elements generally, from entering into the area 40 between such connections as a result of the seal at 36 between the engaging peripheral edges 18 and 32 of the ball and hood. Also, the unitary spherical shape provided by the assembly of the ball 10 and the hood 12 due to the substantial continuation of the spherical surface of the ball provided by the peripheral edge portion 32' of the hood with the adjacent surface 42 of the ball, further minimizes the effects of vibration on the assembly by high winds.

For purposes of mounting the assembly of the ball 10 and hood 12 on a suitable standard or base, there is provided a hollow hub or tube 44 which is connected as by threaded engagement at 46, or alternatively by welding, into a central opening 47 within the hood 12. A mounting element 48 carrying a light bulb socket 49 is connected to the interior of the hub as by threaded engagement therewith, for mounting a bulb indicated at 49', and suitable electrical leads indicated at 44', are passed through the interior of the hub.

FIG. 4 of the drawing shows the assembled lighting fixture 10, 12 of FIGS. 1 to 3 mounted on a suitable pole or standard indicated at 50. In this application, pole 50 has three arms 52, on each of which is mounted, by means of hub 44, one of the invention lighting fixtures comprising the translucent ball 10 and the mounting fixture 12. In this application, 24 inch diameter plastic balls 10 are employed with 300 to 500 watt lights at 49'.

Referring to FIG. 5 of the drawing, there is shown the application of the lighting fixture of the invention suspended from the ceiling for interior lighting. In this application, the combination ball 10 and mounting 12 of FIGS. 1 to 3 is hung from the ceiling 54 by means of a stem 56 connected to the hub 44. Translucent plastic balls 10 having a diameter, for example, of the order of about 18 inches are employed for this purpose using up to 300 watt incandescent bulbs.

It will be understood that various modifications can be made in the invention device and within the purview of the invention. Thus, for example, as illustrated in FIG. 6, in place of the resilient backing 36 of FIG. 2, an O-ring type seal 60, formed of a resilient, e.g., rubber, material can be disposed between the ring 16' and the hood 12. The O-ring 60 is positioned in the space between the intersection 62 of the members 32 and 28' of the hood 12, and the apex 64 of the ring 16' mounted on ball 10. Also, if desired, both the resilient backing element 36 and the O-ring seal 60 can be employed together, to form a particularly water-proof assembly.

Although the use of screw connectors such as 24 and 28 between the ball and hood are preferred for tight positive engagement, if desired, other connecting means such as snap-on connectors can be employed.

From the foregoing, it is seen that the invention provides an efficient, simple and reliable mounting assembly for a lighting fixture comprising a relatively large plastic ball which is securely held on its mounting against loosening or breakage of the plastic ball by winds, vibrations and the like. Further, the assembled globe or ball and mounting presents a pleasing, simple decorative appearance of an essentially unitary sphere with a metal closure member at its upper end. It is particularly noted that the ball and hood mounting assembly can be positioned in any desired manner, with the hood mounting, e.g., 12, positioned at the top of the ball, or the hood can be positioned at the bottom with the ball supported thereon. In any of these positions the ball and hood assembly are in secure engagement and form a water-proof seal.

While I have described particular embodiments of my invention for the purpose of illustration, it should be understood that various modifications and adaptations thereof may be made within the spirit of the invention and within the scope of the appended claims.

I claim:
1. A lighting fixture comprising a translucent plastic ball having an opening on one side thereof, said opening defining a circle having a diameter substantially less than the diameter of said ball, a ring positioned on said ball in contact with the inner peripheral surface of said ball adjacent said opening, a plurality of countersunk screws around the periphery of said ball opening and passing through the adjacent peripheral edges of said ball and said ring to securely connect said ring to said ball, a first internally threaded flange mounted on said ring adjacent the ball opening and extending inwardly into said ball, a hood positioned over said ball opening, a second externally threaded flange mounted on said hood and in mating threaded engagement with said first flange, said hood having a peripheral edge disposed around and overlapping the outer peripheral surface of said ball around said opening therein, a rubber backing ring disposed adjacent the inside surface of said overlapping peripheral edge of said hood, the outer surface of the peripheral edge of said ball adjacent said opening being in secure engagement with said backing ring and sealing the space between the overlapping peripheral edges of said ball adjacent said opening and of said hood, said backing ring overlying said screws, thereby securely mounting said plastic ball on said hood and closing said opening in said ball with said threadably engaged flanges being completely enclosed within the ball and hood assembly, and a hub connected centrally to said hood for operatively mounting the ball and hood assembly.

2. A lighting fixture as defined in claim 1, including a groove on the inside surface of said overlapping peripheral edge of said hood, said backing ring being disposed in said groove.

3. A lighting fixture as defined in claim 1, said hood forming a segment of a sphere and having a radius of curvature substantially the same as the radius of curvature of said ball, and the external surface of said peripheral edge of said hood being tapered outwardly, whereby said ball and hood assembly forms a substantially unitary sphere.

4. A lighting fixture comprising a translucent plastic ball having an opening on one side thereof, a ring positioned on said ball around the periphery of said opening, means securely connecting said ring to said ball, an internally threaded flange connected to said ring and disposed adjacent said opening in said ball, a hood positioned over said opening, an externally threaded flange mounted on said hood and in engagement with said first mentioned flange, said hood having a peripheral edge disposed around and overlapping the periphery of said opening in said ball, said threadably engaged flanges being completely enclosed within the ball and hood assembly, a resilient element disposed between the inner periphery of said peripheral edge of said hood and the periphery of said ball adjacent said opening, and sealing the space between the overlapping peripheral edges of said ball adjacent said opening and of said hood, thereby securely mounting said ball on said hood and closing said opening in said ball, said hood forming a segment of a sphere so that said ball and hood assembly forms a substantially unitary sphere, and means connected to said hood for operatively mounting the ball and hood assembly.

References Cited

UNITED STATES PATENTS

| 1,184,952 | 5/1916 | Hipkins | 240—100 |
| 2,549,658 | 4/1951 | Blythe | 240—100 |
| 2,779,866 | 1/1957 | Burlingham | 240—100 |
| 3,275,816 | 9/1966 | Brunger | 240—106 |

FOREIGN PATENTS 440,663  1/1936  Great Britain.

NORTON ANSHER, *Primary Examiner.*

W. M. FRYE, *Assistant Examiner.*